H. E. BIDWELL.
Fruit-Driers.
No. 150,127. Patented April 28, 1874.
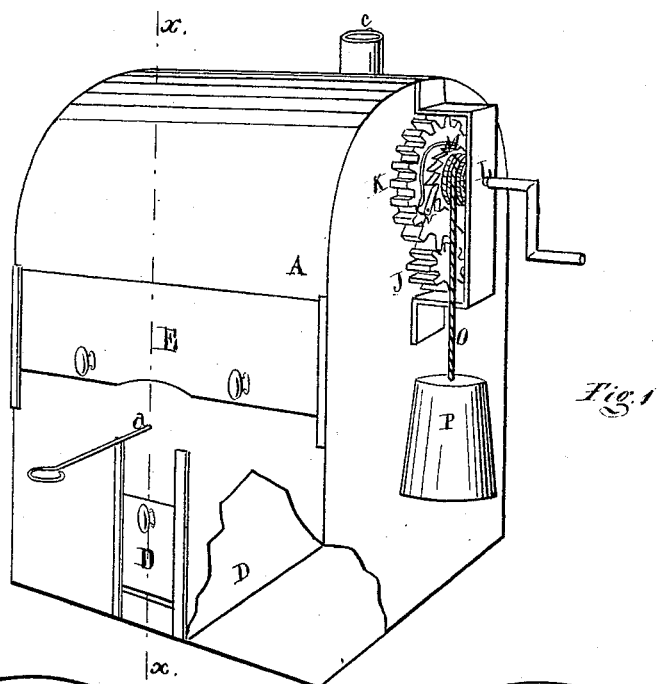
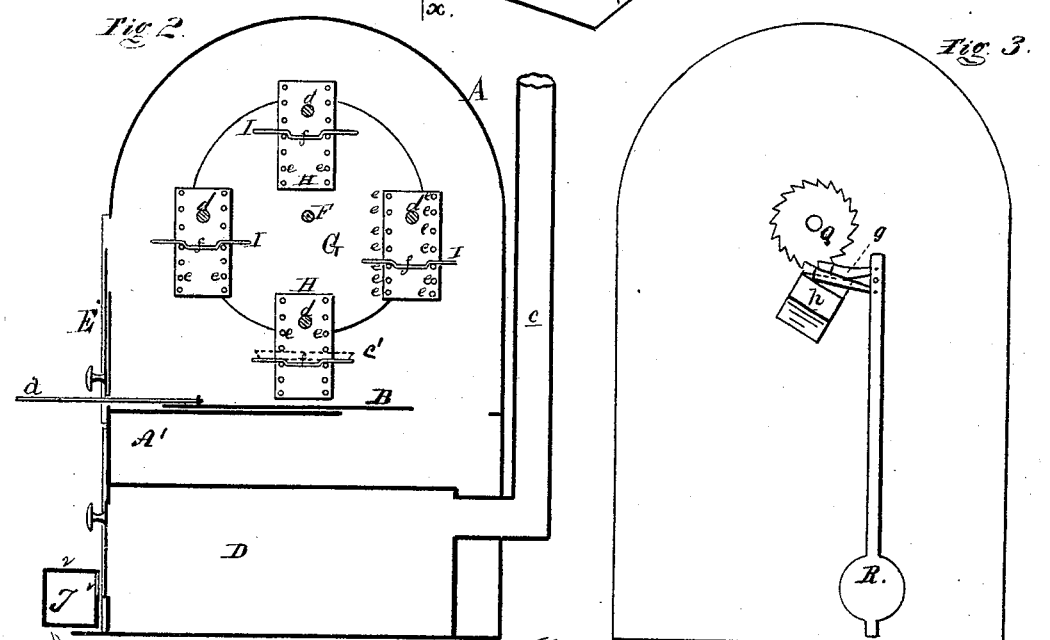
ATTEST.
M. Gardner
Jas Lawlo
INVENTOR.
Henry E. Bidwell

UNITED STATES PATENT OFFICE.

HENRY E. BIDWELL, OF SOUTH HAVEN, MICHIGAN.

IMPROVEMENT IN FRUIT-DRIERS.

Specification forming part of Letters Patent No. 150,127, dated April 28, 1874; application filed October 30, 1873.

*To all whom it may concern:*

Be it known that I, HENRY E. BIDWELL, of South Haven, in the county of Van Buren and State of Michigan, have invented an Improvement in Evaporators, of which the following is a specification:

This invention has for its object to furnish a novel and economical evaporator, in which fruits, herbs, vegetables, and other articles may be dried in a uniform temperature of dry heated circulating air, which rapidly deprives them of their moisture by causing each point of the article to be dried to come in direct and constant contact with new dry air of either a high or low temperature, the surplus heated air being liberated or retained by means of the sliding partition in connection with the hot-air chamber below, and which, with the use of chloride of calcium to collect the moisture, causes the articles to dry in the shortest possible time, so as to preserve their component parts from decay.

This invention consists in the use of chloride of calcium in a closed arched-top chamber, in the upper part of which a reel is journaled and actuated by a weight through a train of gears, and a pendulum escapement for regulating the speed of the reel. The reel is provided with a series of pivoted supporting-racks to receive trays of wire cloth, on which the substance to be dried and the chloride of calcium to absorb the moisture are placed. The lower part is partitioned to contain a heating-stove, surrounding which is an air-chamber to contain surplus heat, and in the partition is a sliding valve to regulate the ascent of heated dry air into the drying-chamber above; and in front of the stove, in connection with the draft, is a box to contain chloride of calcium, over which the air must pass for the purpose of drying it before entering the stove.

Figure 1 is a perspective view of the evaporator with a portion of one end broken away. Fig. 2 is a cross-section at $x\ x$. Fig. 3 is an elevation of the pendulum and escapement. Fig. 4 is a perspective view of a fruit-tray.

In the drawing, A represents the evaporator, which rests upon a brick foundation. The chamber is divided into two compartments by a partial partition, A', and a sliding damper, B, actuated by a rod, $a$. C' is a dish holding dry chloride of calcium, which has the property of absorbing the moisture from the air and becoming a fluid, after which the moisture can be removed, so that it can be used again. D is a stove in the lower chamber for heating the air in the latter. The products of combustion find an exit from the stove through a flue, $c$, carried through the back wall of the lower chamber. E is a sliding door at the opening in the drying-chamber, by which to have access to its interior to place trays or remove them from the reel. F is a shaft journaled through the gable-ends of the drying-chamber, within which two disks, G, are secured thereto. $d$ are four rods running across from one disk to the other, near their peripheries, and at each end a plate, H, is hung thereon, above its center. From the sides of these plates seven pairs of wires extend to the opposite plate to receive trays I, of light iron covered with wire cloth of open mesh. The frame of each tray has a depression, $f$, at each end, which is received between the pair of supporting-wires, and is thereby kept in place. On one end of the shaft F outside the chamber a pinion, J, is secured thereto, with which connects spur-wheel K, sleeved on a shaft, L, on which is a ratchet, M, with which engages a spring, N, pivoted on said wheel K. O is a cord secured on the ratchet-drum, with a weight, P, suspended from its free end. When this cord is wound upon the drum the weight serves as a motor to rotate the spur-wheel and pinion, and through them the reel and its tray-supports, which latter, being hung in the manner described, always remain in a horizontal position as they revolve. To govern the rotation of the reel-shaft, on the other end of the latter is secured an escape-wheel, Q, whose teeth alternately give an impulse to two pallets, $g$, pivoted the one above the pivot, and the other below the pivot of a pendulum, P. The pallets are caused to engage with the teeth of the escape-wheel by running on two inclined planes, $h$, under said wheel. The pendulum is provided with a sliding weight, S, which may be moved up or down to accelerate or retard the vibration of said pendulum and the revolution of the reel. T is a box for the purpose of holding dry chloride of calcium, over which the air must pass before entering the stove. $r\ r$ are openings in the box.

The advantages of this evaporator are, that the temperature of the drying-chamber can be kept uniform during the process of evaporation, and the rotation of the reel causes a continual change or evolution of the heated currents, which act upon the substances with greater effect, as they are continually subjected to fresh currents of dry air, making the process much more rapid than any heretofore used, increasing the capacity, and reducing the cost of operating the drier. By means of the sliding partition the temperature of the drying-chamber can be readily adjusted. By means of the hot-air chamber the surplus heat can be retained for subsequent use. By the use of chloride of calcium the air is dried so as to increase its capacity for taking up more moisture, which shortens the time and increases the value of the substance evaporated.

What I claim as new, and desire to secure by Letters Patent, is—

1. The within-described process of drying animal or vegetable substances, in which chloride of calcium is placed on a dish or tray in a reel-drier and revolved with the substances to be dried.

2. The process of drying animal and vegetable substances, in which chloride of calcium is placed in a suitable receptacle at the mouth of the furnace of the drier, and also upon a revolving tray in the drying-chamber, substantially as set forth.

HENRY E. BIDWELL.

Witnesses:
R. H. WHITTLESEY,
J. C. DOWELL.